(12) United States Patent
Su et al.

(10) Patent No.: US 12,405,762 B2
(45) Date of Patent: Sep. 2, 2025

(54) SYSTEM AND METHOD FOR DISPLAYING AN ONLINE ELECTRONIC DOCUMENT

(71) Applicant: KDAN MOBILE SOFTWARE LTD., Tainan (TW)

(72) Inventors: Po-Chou Su, Tainan (TW); Nan-Kuang Lee, Tainan (TW); Chang-Chou Tsai, Tainan (TW); Jung-Chen Lee, Tainan (TW)

( * ) Notice: Subject to any disclaimer, the term of this patent is extended or adjusted under 35 U.S.C. 154(b) by 0 days.

(21) Appl. No.: 18/641,506

(22) Filed: Apr. 22, 2024

(65) Prior Publication Data
US 2024/0354046 A1    Oct. 24, 2024

Related U.S. Application Data

(60) Provisional application No. 63/460,700, filed on Apr. 20, 2023.

(51) Int. Cl.
*G06F 3/14* (2006.01)
*H04L 9/40* (2022.01)
*H04L 65/1069* (2022.01)

(52) U.S. Cl.
CPC ........ *G06F 3/1454* (2013.01); *H04L 63/0853* (2013.01); *H04L 65/1069* (2013.01)

(58) Field of Classification Search
CPC ...... G06F 21/32; G06F 21/645; G06F 3/0304; G06F 3/03545; G06F 3/04883; G06F 40/171; G06F 40/174; G06F 2211/004; G06F 3/1454; G06Q 10/10; G06Q 40/03; G06Q 50/18; H04L 12/1831; H04L 9/3247; H04L 63/0853; H04L 63/10; H04L 63/126; H04L 65/1069; G09G 2358/00

See application file for complete search history.

(56) References Cited

U.S. PATENT DOCUMENTS 11,586,806 B1 *  2/2023 Singh .................. G06F 21/32
2016/0335479 A1 * 11/2016 Bartlett, II ............ H04L 67/146
2019/0121846 A1 *  4/2019 Kim .................... G06F 3/03545

* cited by examiner

*Primary Examiner* — Nelson M Rosario
(74) *Attorney, Agent, or Firm* — OPES IP Consulting Co., Ltd.

(57) ABSTRACT

A system for displaying an online electronic document includes a document server, a notification server and a remote conference server. The remote conference server is configured to establish a conference call connection between a first electronic device and a second electronic device. The first electronic device and the second electronic device respectively download from the document server and display an electronic document. After one page of the electronic document displayed on the first electronic device is switched to another page, the first electronic device generates a page turning indication and transmits the page turning indication to the notification server via the document server. The notification server transmits the page turning indication to the second electronic device, and one page of the electronic document displayed on the second electronic device is switched to another page in response to the page turning indication.

10 Claims, 9 Drawing Sheets

SYSTEM AND METHOD FOR DISPLAYING AN ONLINE ELECTRONIC DOCUMENT

CROSS-REFERENCE TO RELATED APPLICATION

The present disclosure claims the benefit of and priority to U.S. provisional Patent Application Ser. No. 63/460,700 filed on Apr. 20, 2023, entitled "Online Signature System, Method and Electronic Apparatus," (hereinafter referred to as "the '700 provisional"). The disclosure of the '700 provisional is hereby incorporated fully by reference into the present disclosure.

FIELD

The present disclosure generally relates to a system and method for displaying an electronic document, and more particularly, to a system and method for displaying an online electronic document.

BACKGROUND

With the development of global e-commerce, many document or contract reviews and signature execution are no longer limited to paper documents, and gradually the paper documents have been replaced by electronic documents. However, when an electronic document needs to be reviewed and/or signed by multiple parties online, there is room for improvement in enabling the electronic document to be synchronously displayed and operated (for example, synchronously turning pages) on the display devices of multiple parties in an online conference call.

SUMMARY

The present disclosure provides a system for displaying an online electronic document including a remote conference server, a document server and a notification server. The remote conference server is configured to establish a conference call connection between a first electronic device and a second electronic device. The document server is configured to provide an electronic document for the first electronic device and the second electronic device to download. The electronic document includes at least a first page and a second page. After the electronic document is downloaded by the first electronic device and the second electronic device, respectively, a first page of the electronic document is synchronously displayed on a first display of the first electronic device and a second display of the second electronic device. The first page displayed on the first display is switched to the second page through a page turning operation to cause the first electronic device to generate a page turning indication and transmit the page turning indication to the document server. The document server is configured to receive the page turning indication from the first electronic device and transmit the page turning indication to the notification server. The notification server is configured to receive the page turning indication from the document server and transmit the page turning indication to the second electronic device. After the page turning indication is received by the second electronic device, the first page displayed on the second display is switched to the second page in response to the page turning indication.

In the system according to an embodiment of the present disclosure, the second page has a signature area. After the first page displayed on the second display is switched to the second page in response to the page turning indication, the signature area is displayed on the second display for receiving a signature object. The signature object is generated based on an input received by the second electronic device and is presented on the signature area displayed on the second display. The document server is configured to receive the signature object from the second electronic device and transmit the signature object to the notification server. After the notification server receives the signature object from the document server, the notification server transmits the signature object to the first electronic device. After the signature object is received by the first electronic device, the signature object is presented on the signature area of the second page displayed on the first display, such that the signature object is synchronously presented on the signature area displayed on the first display and on the signature area displayed on the second display.

In the system according to an embodiment of the present disclosure, the signature object is a static signature image, and the static signature image is encoded into an image format string by the second electronic device. The signature object received and transmitted by the document server to the notification server is the image format string. The signature object received and transmitted by the notification server to the first electronic device is the image format string. After the image format string is received by the first electronic device, the image format string is decoded into the static signature image and presented on the signature area of the second page displayed on the first display.

In the system according to another embodiment of the present disclosure, the signature object is a dynamic signature image, and the dynamic signature image is encoded into an image format string array by the second electronic device. The signature object received by the document server from the second electronic device is the image format string array, the document server is further configured to convert the image format string array into a video format string array, and the signature object transmitted by the document server to the notification server is the video format string array. The signature object received and transmitted by the notification server to the first electronic device is the video format string array. After the video format string array is received by the first electronic device, the video format string array is decoded into a dynamic signature video and presented on the signature area of the second page displayed on the first display.

In the system according to another embodiment of the present disclosure, the signature object includes a static signature image and a dynamic signature image, the static signature image is encoded into an image format string by the second electronic device, and the dynamic signature image is encoded into an image format string array by the second electronic device. The signature object received by the document server from the second electronic device includes the image format string and the image format string array, the document server is further configured to convert the image format string array into a video format string array, and the signature object transmitted by the document server to the notification server includes the image format string and the video format string array. The signature object received and transmitted by the notification server to the first electronic device includes the image format string and the video format string array. After the image format string and the video format string array are received by the first electronic device, the image format string is decoded into the static signature image and the video format string array is decoded into a dynamic signature video. The decoded static signature image and the dynamic signature video are sequentially presented on the signature area of the second page displayed on the first display.

The present disclosure provides a method for displaying an online electronic document, and the method includes: establishing, by a remote conference server, a conference call connection between a first electronic device and a second electronic device; providing, by a document server, an electronic document including at least a first page and a second page to be downloaded by the first electronic device and the second electronic device; displaying the first page of the electronic document on a first display of the first electronic device and a second display of the second electronic device synchronously after the electronic document is downloaded by the first electronic device and the second electronic device, respectively; switching the first page displayed on the first display to the second page through a page turning operation to generate a page turning indication; receiving, by the document server, the page turning indication and transmitting the page turning indication to a notification server; receiving, by the notification server, the page turning indication from the document server and transmitting the page turning indication to the second electronic device; and switching the first page displayed on the second display to the second page in response to the page turning indication received from the notification server.

The method according to the present embodiment of the present disclosure further includes: displaying a signature area of the second page on the second display after the first page displayed on the second display is switched to the second page; receiving, by the second electronic device, an input to generate a signature object and presenting the signature object on the signature area displayed on the second display; receiving, by the document server, the signature object from the second electronic device and transmitting the signature object to the notification server; receiving, by the notification server, the signature object from the document server and transmitting the signature object to the first electronic device; and presenting the signature object on the signature area of the second page displayed on the first display after the signature object is received by the first electronic device.

In the method according to an embodiment of the present disclosure, the signature object is a static signature image, and the static signature image is encoded into an image format string. The signature object received and transmitted by the document server to the notification server is the image format string. The signature object received and transmitted by the notification server to the first electronic device is the image format string. Presenting the signature object on the signature area of the second page displayed on the first display further includes decoding the image format string into the static signature image and presenting the static signature image on the signature area of the second page displayed on the first display.

In the method according to another embodiment of the present disclosure, the signature object is a dynamic signature image, and the dynamic signature image is encoded into an image format string array. The signature object received by the document server from the second electronic device is the image format string array, the image format string array is converted by the document server into a video format string array, and the signature object transmitted by the document server to the notification server is the video format string array. The signature object received and transmitted by the notification server to the first electronic device is the video format string array. Presenting the signature object on the signature area of the second page displayed on the first display further includes decoding the video format string array into a dynamic signature video and presenting the dynamic signature video on the signature area of the second page displayed on the first display.

In the method according to another embodiment of the present disclosure, the signature object includes a static signature image and a dynamic signature image, the static signature image is encoded into an image format string by the second electronic device, and the dynamic signature image is encoded into an image format string array by the second electronic device. The signature object received by the document server from the second electronic device includes the image format string and the image format string array, the image format string array is converted into a video format string array by the document server, and the signature object transmitted by the document server to the notification server includes the image format string and the video format string array. The signature object received and transmitted by the notification server to the first electronic device includes the image format string and the video format string array. Presenting the signature object on the signature area of the second page displayed on the first display further includes: decoding the image format string into the static signature image and decoding the video format string array into a dynamic signature video; and presenting the decoded static signature image and the dynamic signature video sequentially on the signature area of the second page displayed on the first display.

BRIEF DESCRIPTION OF THE DRAWINGS

In order to make the above and other objects, features, advantages and embodiments of the present disclosure more readily understood, the accompanying drawings are described as follows.

DETAILED DESCRIPTION OF THE PREFERRED EMBODIMENTS

In the present disclosure, "a," "an," and "the" may refer to a singular form or a plural form, unless an article is specifically restricted to be a singular form in the context.

In addition, as used herein, the terms "comprise/comprising," "include/including," "have/having," and the like are open-ended terms that imply the inclusion of the disclosed features, elements and/or components, but do not preclude the presence or addition of one or more other features, elements, components, and/or groups thereof.

The term "coupled" used in the present disclosure may indicate that two or more elements or devices are in direct physical contact with each other or in indirect physical contact with each other, and may also indicate that two or more elements or devices cooperate or interact with each other.

Furthermore, the ordinal terms (such as "first," "second," "third," and the like) used in the present disclosure and claims are used to modify an element itself and do not imply any priority or any order of one element over another element, or do not imply a chronological order of steps of a method performed, but are used only as symbols to distinguish a claimed element having a particular name from another element having the same name.

The spirit of the present disclosure will be clearly illustrated with drawings and detailed descriptions below. After understanding the embodiments of the present disclosure, those skilled in the art with ordinary knowledge can make modifications and variations based on the technologies taught in the present disclosure without departing from the spirit and scope of the present disclosure.

Figure 1:
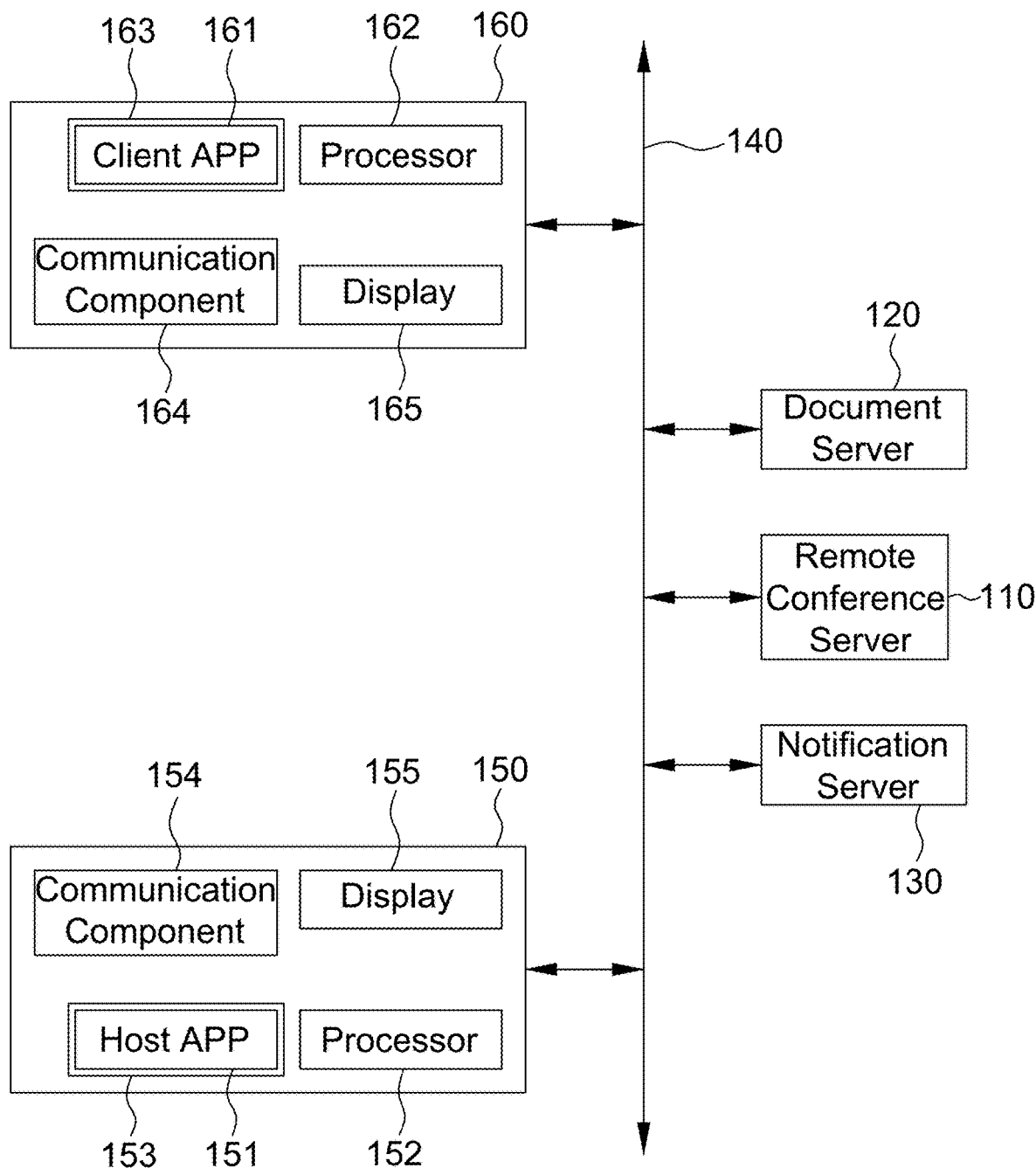
FIG. 1 is a schematic diagram illustrating an architecture of a system for displaying an online electronic document according to an embodiment of the present disclosure.

FIG. 1 is a schematic diagram illustrating an architecture of a system 100 for displaying an online electronic document according to an embodiment of the present disclosure. Referring to FIG. 1, the system 100 for displaying an online electronic document includes a remote conference server 110, a document server 120 and a notification server 130. The remote conference server 110, the document server 120, and the notification server 130 are electronic devices having computing and networking functions and provide services through a network 140. The remote conference server 110 is configured to provide a conference call connection service. The document server 120 is configured to provide an electronic document service. The notification server 130 is configured to provide an operation record and notification service for electronic documents.

The remote conference server 110 establishes a conference call connection between a first electronic device 150 and a second electronic device 160 through the network 140, such that the first electronic device 150 and the second electronic device 160 may have a video conversation or a voice conversation. In addition, in other embodiments, the remote conference server 110 can also establish a conference call connection between the first electronic device 150 and a plurality of second electronic devices 160 at the same time.

In the present embodiment, the system 100 for displaying an online electronic document provides two types of applications (APPs), i.e., a host APP 151 and a client APP 161, for users with different access permissions to use services provided by the system 100. In the present embodiment, the services provided by the system 100 includes synchronously turning a page of an online electronic document and/or executing a signature on the online electronic document. The first electronic device 150 is a device used by a host (e.g., a salesperson providing an electronic document) and has a host APP 151 installed thereon. The second electronic device 160 is a device used by a user (e.g., a client reading and/or executing a signature on an electronic document) and has a client APP 161 installed thereon.

The first electronic device 150 includes a processor 152, a storage 153, a communication component 154, and a display 155. The processor 152 is electrically coupled to the storage 153, the communication component 154, and the display 155. The storage 153 may store the host APP 151.

The second electronic device 160 includes a processor 162, a storage 163, a communication component 164, and a display 165. The processor 162 is electrically coupled to the memory 163, the communication component 164, and the display 165. The storage 163 may store the client app 161.

The processors 152, 162 may be, for example, a central processing unit (CPU), a physics processing unit (PPU), a programmable microprocessor, an embedded controlling chip, a digital signal processor (DSP), an application specific integrated circuit (ASIC), or that like.

The storages 153, 163 may be any type of fixed or removable random access memory (RAM), read-only memory (ROM), flash memory, hard disk, or other similar device, or a combination of these devices.

The communication components 154, 164 may be chips or circuits that employ the local area network (LAN) technology, the wireless LAN (WLAN) technology, or the mobile communication technology. The LAN technology, for example, is Ethernet. The WLAN technology, for example, is Wi-Fi. The mobile communication technology, for example, is the global system for mobile communications (GSM) technology, the third-generation (3G) technology, the fourth-generation (4G) technology, the fifth-generation (5G) technology, or the like.

The displays 155 and 165 are, for example, a liquid crystal display (LCD), a plasma display (PDP), an organic Light-Emitting diode (OLED) display, or the like.

The host APP 151 is installed and stored in the storage 153 of the first electronic device 150 and may be executed by the processor 152. When the host APP 151 is executed by the processor 152, an operation interface of the host APP 151 is displayed on the display 155. Similarly, the client APP 161 is installed and stored in the storage 163 of the second electronic device 160 and may be executed by the processor 162. When the client APP 161 is executed by the processor 162, an operation interface of the client APP 161 is displayed on the display 165.

In addition, the remote conference server 110, the document server 120, and the notification server 130 each have a processor, a storage, and a communication component (not shown but similar to the above-mentioned processors 152, 162, storages 153, 163, and communication components 154, 164).

Figure 2:
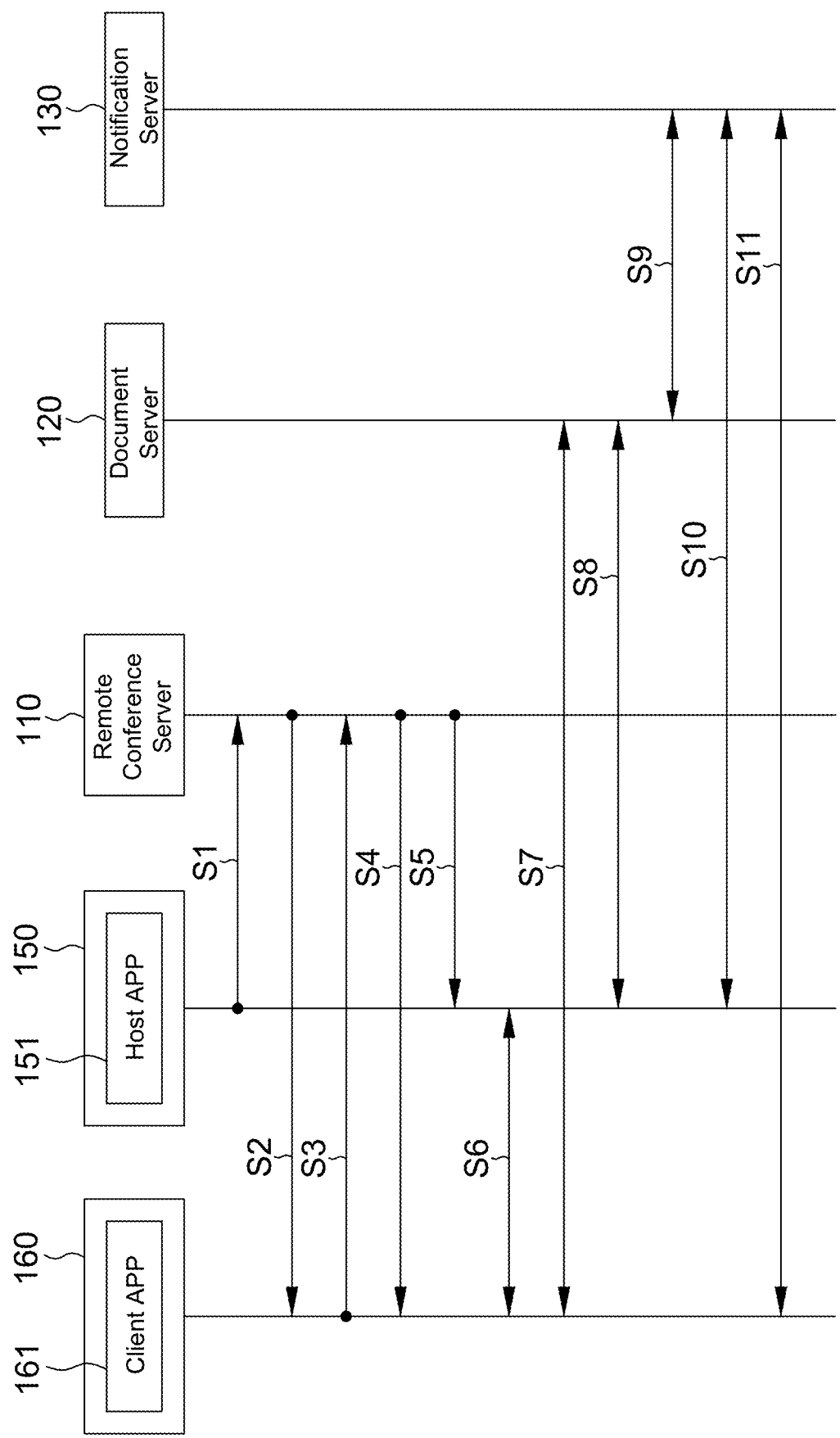
FIG. 2 is a schematic diagram of signaling and channels among devices of the system for displaying an online electronic document according to an embodiment of the present disclosure.

FIG. 2 is a schematic diagram of signaling and channels among devices of the system for displaying an online electronic document according to an embodiment of the present disclosure. Referring to FIG. 2, the first electronic device 150 schedules a conference call with the remote conference server 110 through the host APP 151. For example, the first electronic device 150 transmits a conference request S1 to the remote conference server 110 through the host APP 151. Then, the remote conference server 110 transmits a reservation notification S2 to the client APP 161 of the second electronic device 160 according to the conference request S1 transmitted by the first electronic device 150. Thereafter, the client APP 161 of the second electronic device 160 transmits a confirmation notification S3 to the remote conference server 110. Then, the remote conference server 110 transmits a connection information S4 and connection information S5 to the second electronic device 160 and the first electronic device 150, respectively. Finally, the first electronic device 150 establishes a conference call connection S6 with the client APP 161 of the second electronic device 160 through the host APP 151. During the conference call connection S6, the document server 120 may provide a communication channel S7 to transmit data or control signals to the second electronic device 160 or receive data or control signals from the second electronic device 160 through the communication channel S7. In an embodiment of the present disclosure, the document server 120 may establish the communication channel S7 according to at least one task request signal received from the second electronic device 160 and establish a communication channel S8 according to at least one task request signal received from the first electronic device 150. During the conference call connection S6, the document server 120 may provide another communication channel S8 to transmit data or control signals to the first electronic device 150 or receive data or control signals from the first electronic device 150 through the communication channel S8. In addition, during the conference call connection S6, a communication channel S9 is established between the document server 120 and the notification server 130 for transmitting data or control signals between the document server 120 and the notification server 130. Furthermore, during the conference call connection S6, the notification server 130 may provide a communication channel S10 for transmitting data or control signals to the first electronic device 150 or receiving data or control signals from the first electronic device 150 through the communication channel S10. During the conference call connection S6, the notification server 130 may further provide a communication channel S11 for transmitting data or control signals to the second electronic device 160 or receiving data or control signals from the second electronic device 160 through the communication channel S11. In an embodiment of the present disclosure, the notification server 130 may establish the communication channel S10 according to at least one channel request signal received from the first electronic device 150 and establish the communication channel S11 according to at least one channel request signal received from the second electronic device 160.

Figure 3:
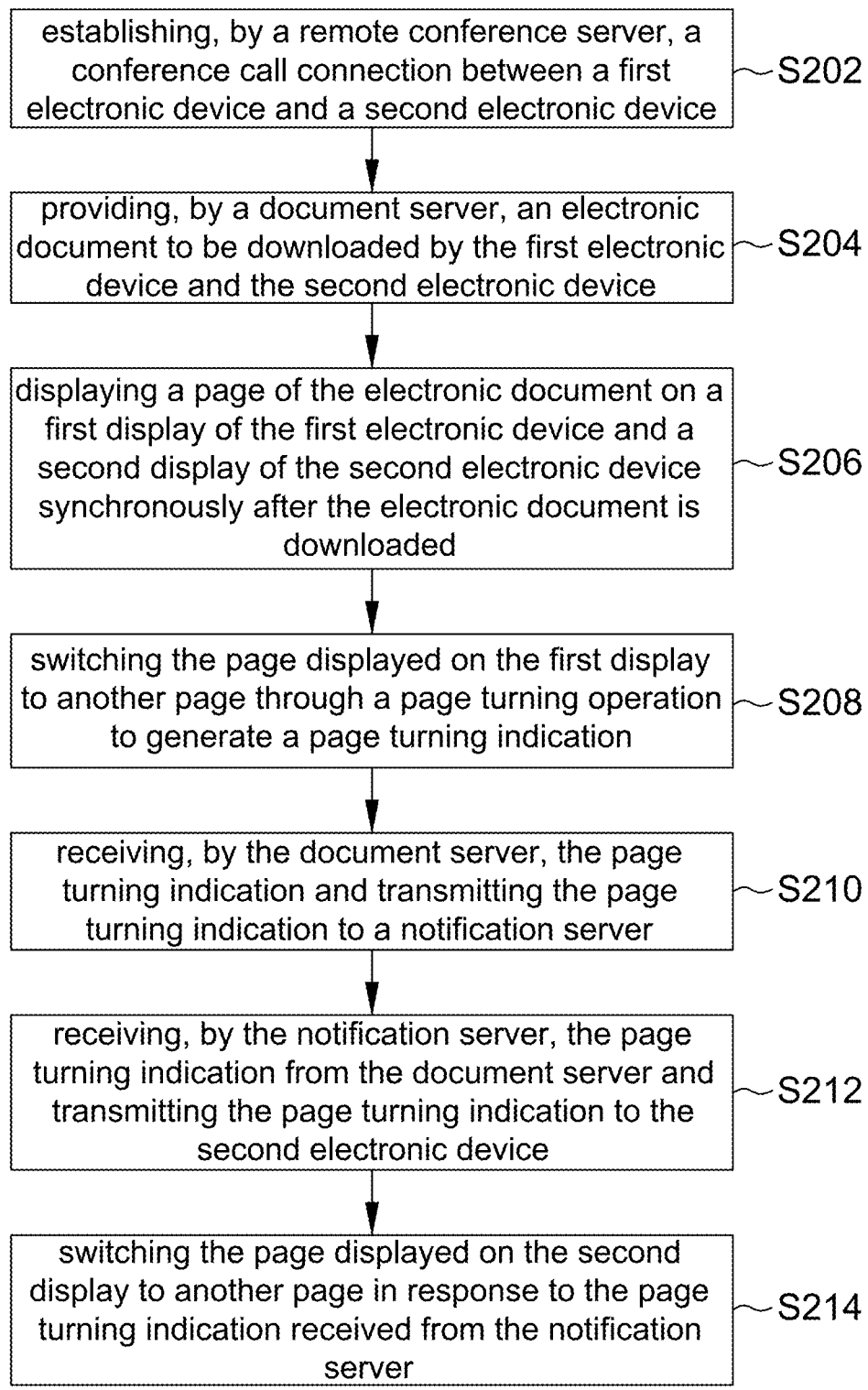
FIG. 3 is a flowchart of a method for displaying an online electronic document according to a first embodiment of the present disclosure.

FIG. 3 is a flowchart of a method for displaying an online electronic document according to a first embodiment of the present disclosure. Referring to FIG. 1 to FIG. 3, in step S202, a conference call connection S6 between the first electronic device 150 and the second electronic device 160 is established by the remote conference server 110. Specifically, the first electronic device 150 and the second electronic device 160 are connected to the network 140 via the communication component 154 and the communication component 164, respectively, to establish by the remote conference server 110 the conference call connection S6 between the first electronic device 150 and the second electronic device 160. In the present embodiment, the conference call connection S6 may be a video telephone connection or a voice telephone connection, such that the host using the first electronic device 150 (e.g., a salesperson providing an electronic document) and the user using the second electronic device 160 (e.g., a client reading and/or executing a signature on the electronic document) can communicate and have a conversation through the conference call connection S6.

In step S204, the document server 120 provides an electronic document for the first electronic device 150 and the second electronic device 160 to download. For example, after the conference call connection S6 is established, the first electronic device 150 may download the electronic document from the document server 120 through the communication channel S8, and the second electronic device 160 may download the electronic document from the document server 120 through the communication channel S7.

In step S206, after the first electronic device 150 and the second electronic device 160 each download the electronic document from the document server 120, the electronic document is displayed synchronously on the display 155 of the first electronic device 150 and the display 165 of the second electronic device 160. For example, after the first electronic device 150 and the second electronic device 160 respectively download an electronic document 170 (as shown in FIG. 4A) from the document server 120, the electronic document 170 is presented on a user interface 156 of the host APP 151 displayed on the display 155 of the first electronic device 150 and is also presented on a user interface 166 of the client APP 161 displayed on the display 165 of the second electronic device 160.

Figure 4A:
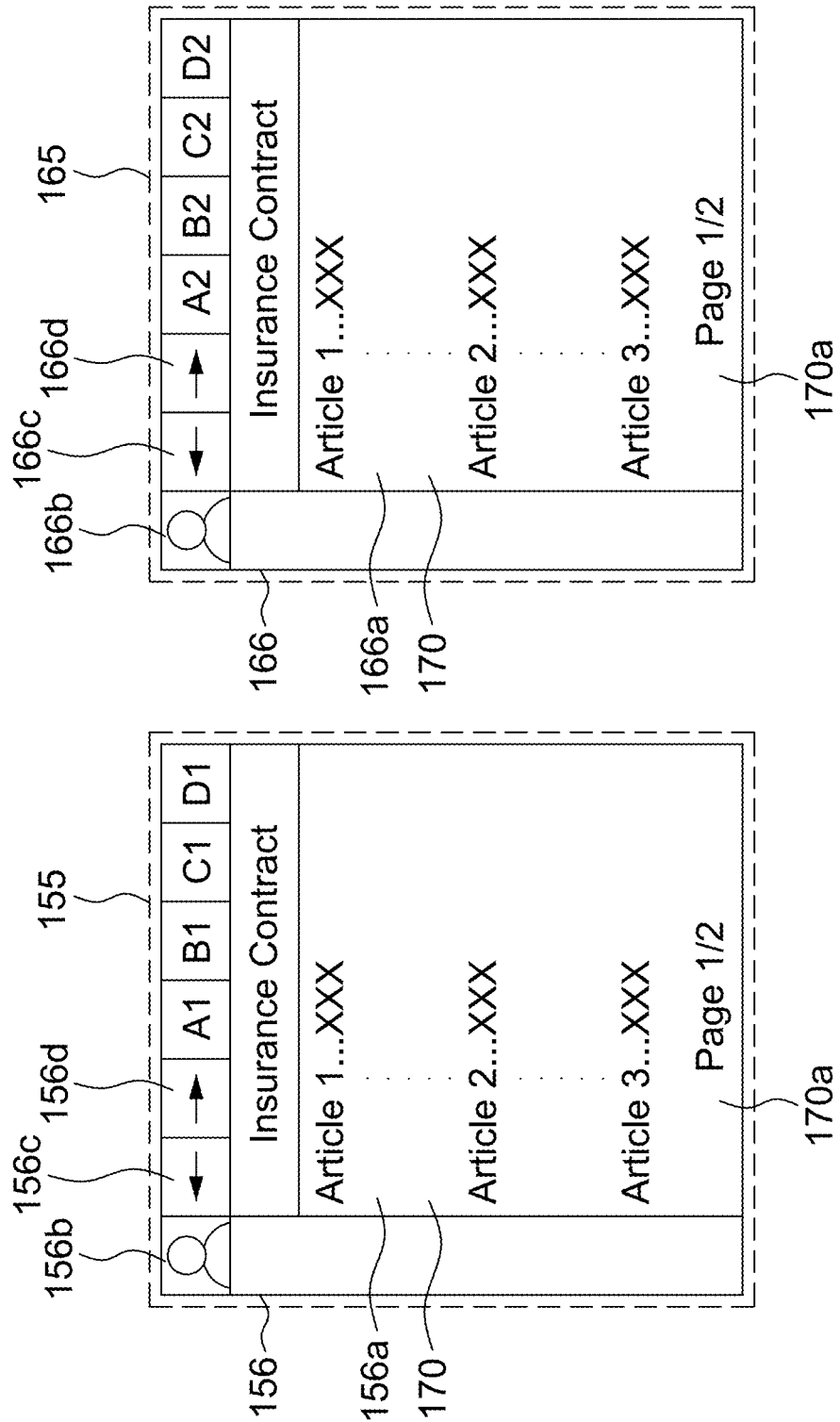
FIG. 4A is a schematic diagram showing a page of an electronic document presented synchronously on a user interface of a host APP and a user interface of a client APP according to an embodiment of the present disclosure.

FIG. 4A is a schematic diagram showing the downloaded electronic document 170 presented synchronously on the user interface 156 of the host APP 151 and the user interface 166 of the client APP 161 according to an embodiment of the present disclosure. In the present embodiment, the electronic document 170 may be, for example, an insurance contract and include two pages. After the first electronic device 150 and the second electronic device 160 respectively download the electronic document 170, at least one page (e.g., the first page 170a) of the electronic document 170 is respectively presented on the user interface 156 of the host APP 151 displayed on the display 155 and on the user interface 166 of the client APP 161 displayed on the display 165. In the present embodiment, the user interface 156 of the host APP 151 includes a document display area 156a, a video window 156b, a previous page button 156c, a next page button 156d, and a plurality of function buttons A1, B1, C1, and D1. The document display area 156a is used to present at least one page (e.g., the first page 170a) of the electronic document 170, the video window 156b is used to display a video image of a user (e.g., a client reading and/or executing signature on the electronic document 170) of the second electronic device 160 connected to the first electronic device 150 for a video call, the previous page button 156c is used to turn a current page of the electronic document 170 presented on the user interface 156 to a previous page, and the next page button 156d is used to turn the current page of the electronic document 170 presented on the user interface 156 to a next page. The plurality of function buttons A1, B1, C1, and D1 may be software buttons related to other functions, such as, but not limited to, a document open button, a document save button, an end call button, and a start call button. In addition, the user interface 166 of the client APP 161 includes a document display area 166a, a video window 166b, a previous page button 166c, a next page button 166d, and a plurality of function buttons A2, B2, C2, and D2. The document display area 166a is used to present at least one page (e.g., the first page 170a) of the electronic document 170, the video window 166b is used to display a video image of a host (e.g., a salesperson providing the electronic document 170) of the first electronic device 150 connected to the second electronic device 160 for the video call, the previous page button 166c is used to turn a current page of the electronic document 170 presented on the user interface 166 to a previous page, and the next page button 166d is used to turn the current page of the electronic document 170 presented on the user interface 166 to a next page. The plurality of function buttons A2, B2, C2, and D2 may be software buttons related to other functions, such as, but not limited to, a document open button, a document save button, an end call button, a start call button, and a signature completion button.

Figure 4B:
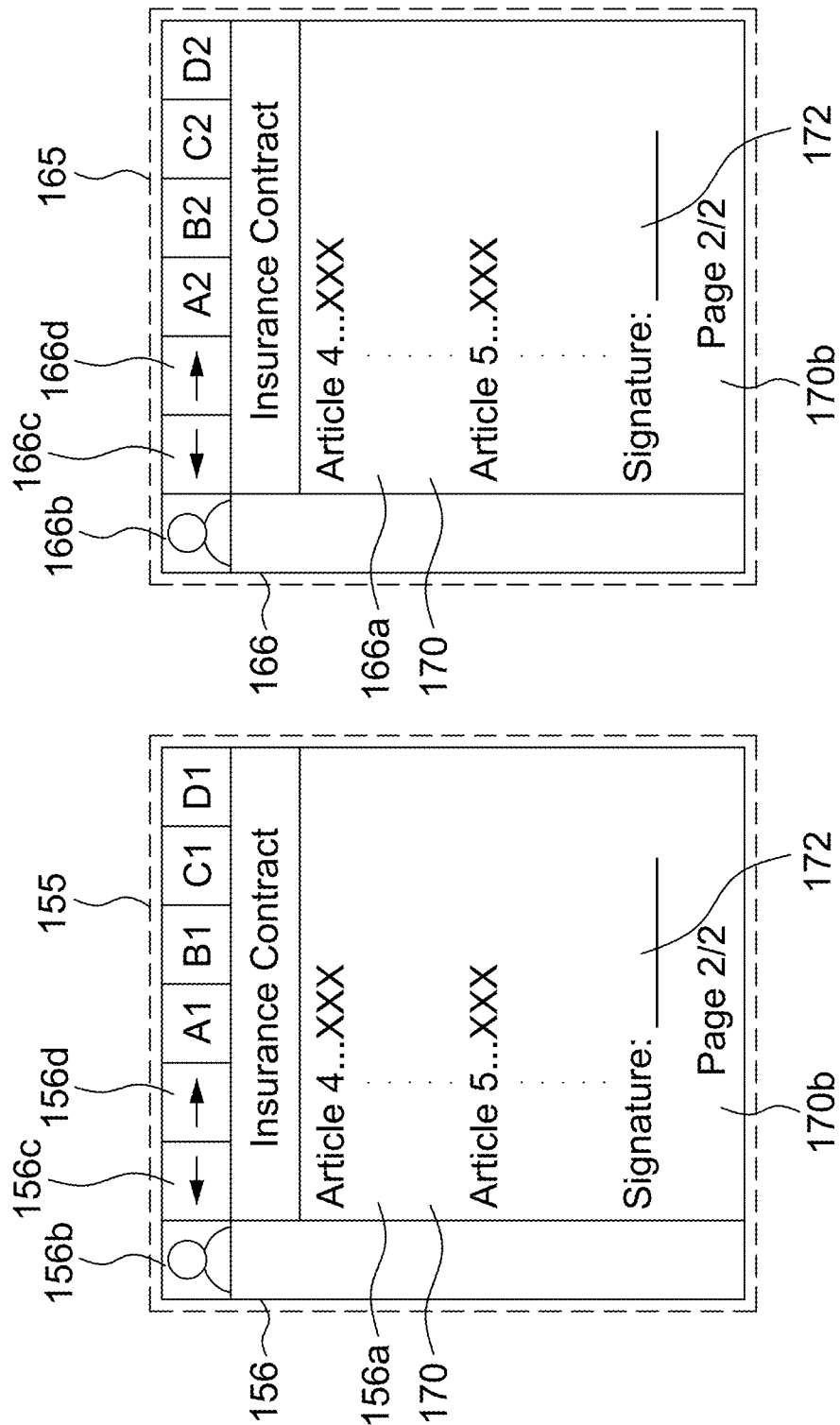
FIG. 4B is a schematic diagram showing another page (without including the signature object) of an electronic document presented on a user interface of a host APP and a user interface of a client APP synchronously according to an embodiment of the present disclosure.

In step S208, a current page of the electronic document displayed on the display 155 is switched to another page through a page turning operation to cause the processor 152 of the first electronic device 150 to generate a page turning indication and transmit, via the communication component 154, the page turning indication to the document server 120 through the communication channel S8. For example, after the host of the first electronic device 150 explains contents listed on the first page 170a of the electronic document 170 to the user of the second electronic device 160 through the conference call connection established by the remote conference server 110, the host may turn the first page 170a (as shown in FIG. 4A) of the electronic document 170 to the second page 170b (as shown in FIG. 4B) through a page turning operation. In the present embodiment, the page turning operation may be completed by selecting the next page button 156d on the user interface 156 via an input device (e.g., a mouse, a keyboard, or a touch panel), but is not limited thereto. After the next page button 156d is selected, the first page 170a of the electronic document 170 presented on the user interface 156 is turned and switched to the second page 170b (as shown in FIG. 4B), and the processor 152 of the first electronic device 150 may generate a page turning indication and transmit, via the communication component 154, the page turning indication to the document server 120 through the communication channel S8. In an embodiment of the present disclosure, the page turning indication may include page turning information, such as the page number "2" of the second page 170b of the electronic document 170, to indicate that the electronic document 170 on the user interface 156 is turned and switched to the second page 170b.

In step S210, the document server 120 receives the page turning indication from the first electronic device 150 and transmits the page turning indication to the notification server 130 through the communication channel S9.

In step S212, the notification server 130 receives the page turning indication from the document server 120 and transmits the page turning indication to the second electronic device 160 through the communication channel S11. In another embodiment of the present disclosure, when the remote conference server 110 simultaneously establishes a conference call connection between the first electronic device 150 and the plurality of second electronic devices 160, the notification server 130 transmits the page turning indication to the plurality of second electronic devices 160 simultaneously. Each of the plurality of second electronic devices 160 performs the same action after receiving the page turning indication. Therefore, the second electronic device 160 mentioned in the following step S214 may refer to a single second electronic device 160 or each of the plurality of second electronic devices 160.

In step S214, after the page turning indication is received by the second electronic device 160, a current page displayed on the display 165 is switched to another page in response to the page turning indication. For example, after the second electronic device 160 receives, via the communication component 164, the page turning indication from the notification server 130, the first page 170a of the electronic document 170 presented on the user interface 166 is turned and switched to the second page 170b (as shown in FIG. 4B) in response to the page turning indication, such that the first page 170a of the electronic document 170 presented on the user interface 156 and the first page 170a of the electronic document 170 presented on the user interface 166 (as shown in FIG. 4A) may be turned and switched to the second page 170b (as shown in FIG. 4B) through the same page turning operation (e.g., a selection of the next page button 156d).

In the present embodiment, after the first page 170a of the electronic document 170 presented on the user interface 156 and the first page 170a of the electronic document 170 presented on the user interface 166 are both switched to the second page 170b (as shown in FIG. 4B), the host of the first electronic device 150 may turn the second page 170b of the electronic document 170 back to the first page 170a through another page turning operation (e.g., a selection of the previous page button 156c). In addition, the user of the second electronic device 160 may turn the second page 170b of the electronic document 170 back to the first page 170a through another page turning operation (e.g., a selection of the previous page button 166c).

Figure 5:
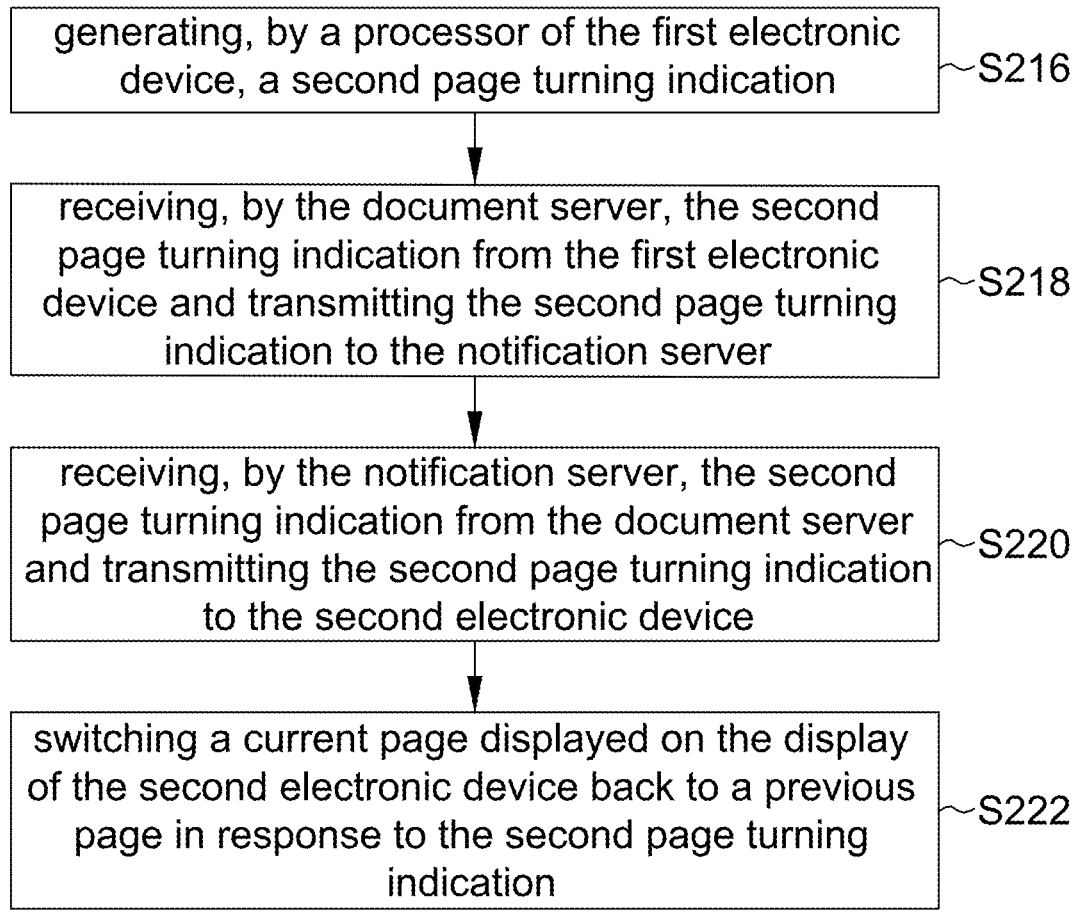
FIG. 5 is a flowchart of a method for displaying an online electronic document according to a second embodiment of the present disclosure.

In a second embodiment of the present disclosure, the method illustrated in FIG. 3 may further include steps S216, S218, S220, and S222 (as shown in FIG. 5). The host of the first electronic device 150 may turn the second page 170b of the electronic document 170 back to the first page 170a through steps S216, S218, S220, and S222.

In step S216, a current page of the electronic document displayed on the display 155 is switched to a previous page through a second page turning operation to cause the processor 152 of the first electronic device 150 to generate a second page turning indication and transmit, via the communication component 154, the second page turning indication to the document server 120 through the communication channel S8. For example, the host may turn the second page 170b (as shown in FIG. 4B) of the electronic document 170 back to the first page 170a (as shown in FIG. 4A) through the second page turning operation. In the present embodiment, the second page turning operation may be completed by selecting the previous page button 156c on the user interface 156 via the above-mentioned input device (e.g., a mouse, a keyboard, or a touch panel), but is not limited thereto. After the previous page button 156c is selected, the second page 170b of the electronic document 170 presented on the user interface 156 is turned and switched back to the first page 170a (as shown in FIG. 4A), and the processor 152 of the first electronic device 150 may generate a second page turning indication and transmit, via the communication component 154, the second page turning indication to the document server 120 through the communication channel S8. In an embodiment of the present disclosure, the second page turning indication may include page turning information, such as the page number "1" of the first page 170a of the electronic document 170, to indicate that the electronic document 170 on the user interface 156 is turned and switched back to the first page 170a.

In step S218, the document server 120 receives the second page turning indication from the first electronic device 150 and transmits the second page turning indication to the notification server 130 through the communication channel S9.

In step S220, the notification server 130 receives the second page turning indication from the document server 120 and transmits the second page turning indication to the second electronic device 160 through the communication channel S11. In another embodiment of the present disclosure, when the remote conference server 110 simultaneously establishes a conference call connection between the first electronic device 150 and the plurality of second electronic devices 160, the notification server 130 transmits the second page turning indication to the plurality of second electronic devices 160 simultaneously. Each of the plurality of second electronic devices 160 may perform the same action after receiving the second page turning indication. Therefore, the second electronic device 160 mentioned in the following step S222 may refer to a single second electronic device 160 or each of the plurality of second electronic devices 160.

In step S222, after the second page turning indication is received by the second electronic device 160, a current page displayed on the display 165 is switched back to a previous page in response to the second page turning indication. For example, after the second electronic device 160 receives, via the communication component 164, the second page turning indication from the notification server 130, the second page 170b of the electronic document 170 presented on the user interface 166 is turned and switched back to the first page 170a (as shown in FIG. 4A) in response to the second page turning indication, such that the second page 170b of the electronic document 170 presented on the user interface 156 and the second page 170b of the electronic document 170 presented on the user interface 166 (as shown in FIG. 4B) may be turned and switched back to the first page 170a (as shown in FIG. 4A) through the same page turning operation (e.g., a selection of the previous page button 156c).

Figure 6:
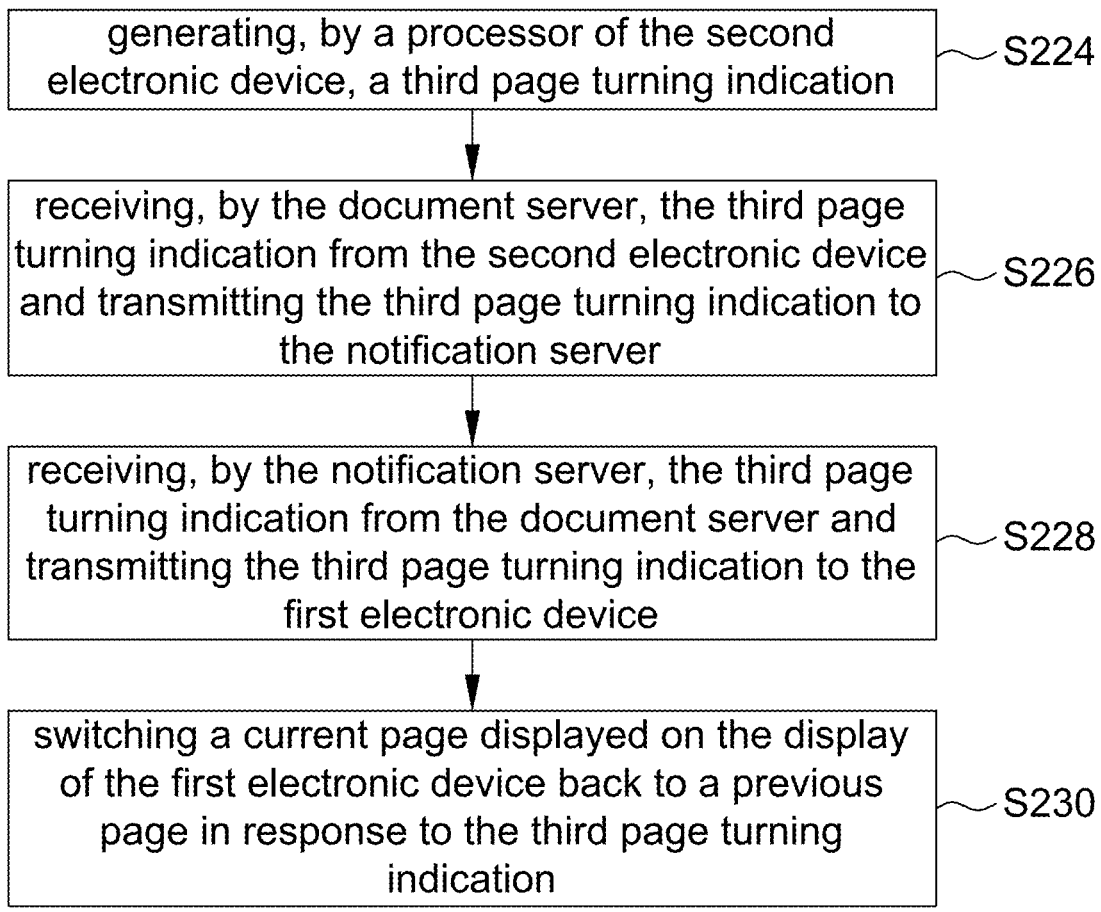
FIG. 6 is a flowchart of a method for displaying an online electronic document according to a third embodiment of the present disclosure.

In a third embodiment of the present disclosure, the method illustrated in FIG. 3 may further include steps S224, S226, S228, and S230 (as shown in FIG. 6). The user of the second electronic device 160 may turn the second page 170b of the electronic document 170 back to the first page 170a through steps S224, S226, S228, and S230.

In step S224, a current page of the electronic document displayed on the display 165 is switched to a previous page through a third page turning operation to cause the processor 162 of the second electronic device 160 to generate a third page turning indication and transmit, via the communication component 164, the third page turning indication to the document server 120 through the communication channel S7. For example, the user may turn the second page 170b (as shown in FIG. 4B) of the electronic document 170 back to the first page 170a (as shown in FIG. 4A) through the third page turning operation. In the present embodiment, the third page turning operation may be completed by selecting the previous page button 166c on the user interface 166 via an input device (e.g., a mouse, a keyboard, or a touch panel), but is not limited thereto. After the previous page button 166c is selected, the second page 170b of the electronic document 170 presented on the user interface 166 is turned and switched back to the first page 170a (as shown in FIG. 4A), and the processor 162 of the second electronic device 160 may generate a third page turning indication and transmit, via the communication component 164, the third page turning indication to the document server 120 through the communication channel S7. In an embodiment of the present disclosure, the third page turning indication may include page turning information, such as the page number "1" of the first page 170a of the electronic document 170, to indicate that the electronic document 170 on the user interface 166 is turned and switched back to the first page 170a.

In step S226, the document server 120 receives the third page turning indication from the second electronic device 160 and transmits the third page turning indication to the notification server 130.

In step S228, the notification server 130 receives the third page turning indication from the document server 120 and transmits the third page turning indication to the first electronic device 150 through the communication channel S10. In another embodiment of the present disclosure, when the remote conference server 110 simultaneously establishes a conference call connection between the first electronic device 150 and the plurality of second electronic devices 160, the notification server 130 transmits the third page turning indication to the plurality of second electronic devices 160 simultaneously. The action performed by each of the plurality of second electronic devices 160 after receiving the third page turning indication may be the same with the action performed by the first electronic device 150 after receiving the third page turning indication. Therefore, in the following step S230, the first electronic device 150, the communication component 154, the display 155, and the user interface 156 can also respectively represent the second electronic devices 160 that receives the third page turning indication, the communication component 164, the display 165, and the user interface 166.

In step S230, after the third page turning indication is received by the first electronic device 150, a current page displayed on the display 155 is switched back to a previous page in response to the third page turning indication. For example, after the first electronic device 150 receives, via the communication component 154, the third page turning indication from the notification server 130, the second page 170b of the electronic document 170 presented on the user interface 156 is turned and switched back to the first page 170a (as shown in FIG. 4A) in response to the third page turning indication, such that the second page 170b of the electronic document 170 presented on the user interface 166 and the second page 170b of the electronic document 170 presented on the user interface 156 (as shown in FIG. 4B) may be turned and switched back to the first page 170a (as shown in FIG. 4A) through the same page turning operation (e.g., a selection of the previous page button 166c).

Referring to FIG. 4B, the second page 170b of the electronic document 170 has a signature area 172. The user of the second electronic device 160 may execute a signature on the signature area 172 after reviewing the contents of the electronic document 170.

Figure 4C:
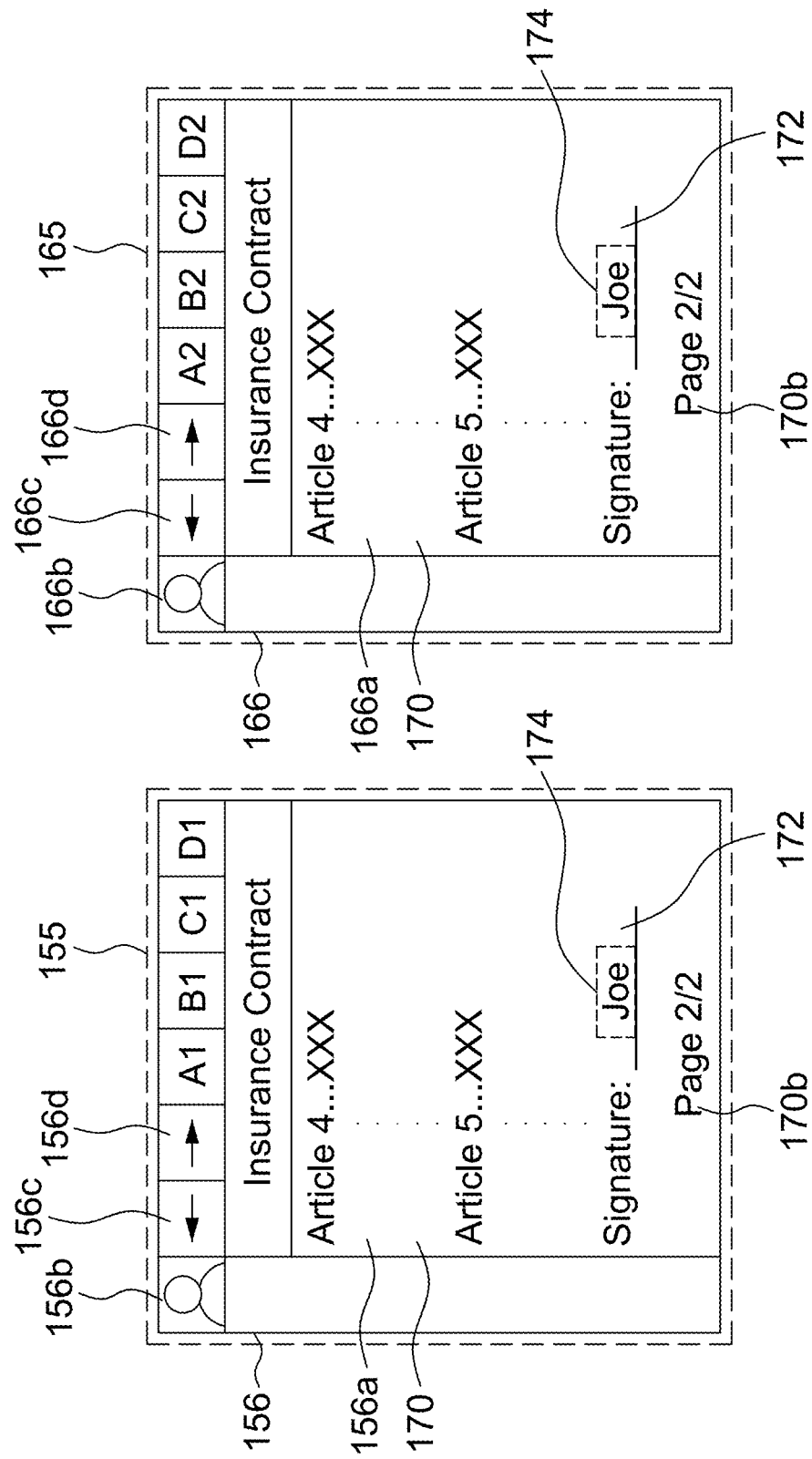
FIG. 4C is a schematic diagram showing another page (including the signature object) of an electronic document presented on a user interface of a host APP and a user interface of a client APP synchronously according to an embodiment of the present disclosure.
Figure 7:
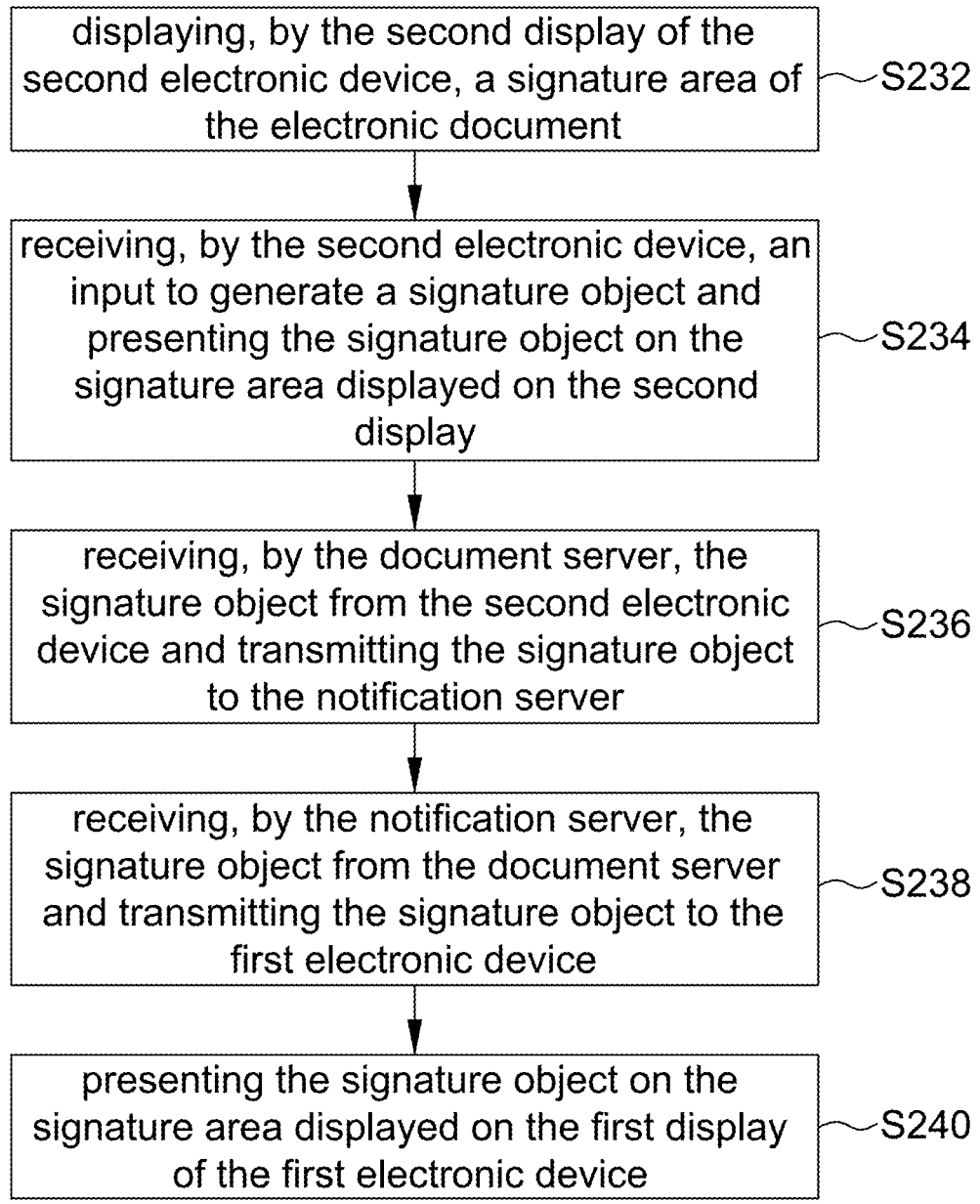
FIG. 7 is a flowchart of a method for displaying an online electronic document according to a fourth embodiment of the present disclosure.

In a fourth embodiment of the present disclosure, the method illustrated in FIG. 3 may further include steps S232, S234, S236, S238, and S240 (as shown in FIG. 7). Referring to FIG. 1, FIG. 2, FIGS. 4A-4C and FIG. 7, after the first page 170a of the electronic document 170 presented on the user interface 156 and the first page 170a of the electronic document 170 presented on the user interface 166 are both switched to the second page 170b (as shown in FIG. 4B), the user of the second electronic device 160 may perform steps S232, S234, S236, S238, and S240 to execute a signature on the signature area 172 of the second page 170b of the electronic document 170 to generate a signature object 174, such that the signature object 174 may be presented synchronously on the electronic document 170 that is presented on the user interface 166 displayed on the display 165 and on the electronic document 170 that is presented on the user interface 156 displayed on the display 155 (as shown in FIG. 4C).

In step S232, after the first page 170a of the electronic document 170 presented by the user interface 166 displayed on the display 165 is switched to the second page 170b, the signature area 172 on the second page 170b is displayed on the display 165 (as shown in FIG. 4B).

In step S234, the second electronic device 160 receives an input to generate the signature object 174 and presents the signature object 174 on the signature area 172 displayed on the display 165 (as shown in FIG. 4C), and then transmits the signature object 174 to the document server 120 via the communication component 164. For example, that second electronic device 160 may receive an input via an input device (e.g., a handwriting tablet, a touch panel, or an image capture device) to generate the signature object 174. In a case that an input is received from a handwriting tablet or a touch panel, the signature object 174 generated is a handwritten signature track (e.g., Joe). In a case that an input is received from an image capture device, the signature object 174 generated is a stamp image or a handwritten signature image. In addition, the second electronic device 160 may transmit, via the communication component 164, the signature object 174 to the document server 120 through the communication channel S7.

In step S236, the document server 120 receives the signature object 174 from the second electronic device 160 and transmits the signature object 174 to the notification server 130 through the communication channel S9.

In step S238, the notification server 130 receives the signature object 174 from the document server 120 and transmits the signature object 174 to the first electronic device 150 through the communication channel S10. In another embodiment of the present disclosure, when the remote conference server 110 simultaneously establishes a conference call connection between the first electronic device 150 and the plurality of second electronic devices 160, the notification server 130 transmits the signature object 174 to the plurality of second electronic devices 160 simultaneously. The action performed by each of the plurality of second electronic devices 160 after receiving the signature object 174 may be the same with the action performed by the first electronic device 150 after receiving the signature object 174. Therefore, in the following step S240, the first electronic device 150, the communication component 154, the display 155, and the user interface 156 can also respectively represent the second electronic devices 160 that receives the signature object 174, the communication component 164, the display 165, and the user interface 166.

In step S240, after the signature object 174 is received by the first electronic device 150, the signature object 174 is presented on the signature area 172 of the second page 170b displayed on the display 155 (as shown in FIG. 4C). For example, after that first electronic device 150 receives the signature object 174 from the notification server 130 via the communication component 154, the processor 152 may present the signature object 174 on the signature area 172 of the second page 170b displayed by the display 155, such that the signature object 174 may be presented synchronously on the second page 170b of the electronic document 170 presented on the user interface 166 and on the second page 170b of the electronic document 170 presented on the user interface 156 through the same signature operation performed by the user (as shown in FIG. 4C).

In another embodiment of that present disclosure, after the signature object 174 is presented synchronously on the electronic document 170 that is presented on the user interface 166 displayed on the display 165 and on the electronic document 170 that is presented on the user interface 156 displayed on the display 155 (as shown in FIG. 4C), the user of the second electronic device 160 may select (for example, by using a mouse, touch panel or handwriting tablet) a signature completion button provided on the client APP 161 to transmit to the first electronic device 150 a notification of completing the signature task. For example, when the signature completion button provided on the client APP 161 is selected, the processor 162 may generate a signature completion signal and transmit the signature completion signal to the document server 120 through the communication channel S7. The document server 120 may receive the signature completion signal and transmit the signature completion signal to the notification server 130 through the communication channel S9. In addition, the document server 120 may also transmit the signature completion signal to the remote conference server 110 to notify the remote conference server 110 that the electronic document 170 has been signed. Then, the notification server 130 receives the signature completion signal from the document server 120 and transmits the signature completion signal to the first electronic device 150 through the communication channel S10. Finally, the first electronic device 150 receives the signature completion signal, and the processor 152 generates a notification message to be displayed on the display 155 according to the signature completion signal. In another embodiment of the present disclosure, after the document server 120 receives the signature completion signal, the document server 120 may combine the signature object 174 received in step S236 with the electronic document 170 to obtain a signed document and store the signed document in a database.

In the present embodiment of the present disclosure, when a user of the second electronic device 160 executes a signature of his or her name (e.g., Joe) on the signature area 172 of the second page 170b of the electronic document 170 via an input device (e.g., a handwriting tablet or a touch panel), the input device may generate a plurality of signals according to a signature trace of the user on the input device, and the processor 162 may receive the plurality of signals and generate the signature object 174 based on the plurality of signals.

In an embodiment of the present disclosure, the signature object 174 may be a static signature image (e.g., a static image showing a handwritten "Joe"), and the static signature image may be encoded into an image format string (e.g., a Base64 image format string) by the processor 162 of the second electronic device 160. In step 234, the second electronic device 160 may transmit, via the communication device 164, the image format string representing the signature object 174 to the document server 120 through the communication channel S7. In step S236, the document server 120 receives the image format string and transmits the image format string to the notification server 130 through the communication channel S9. In step S238, the notification server 130 receives the image format string from the document server 120 and transmits the image format string to the first electronic device 150 through the communication channel S10. In step S240, after the image format string is received by the first electronic device 150, the processor 152 may decode the image format string back into the static signature image (e.g., the static image showing the handwritten "Joe") and present the static signature image on the signature area 172 of the second page 170b displayed on the display 155 (as shown in FIG. 4C).

In another embodiment of the present disclosure, the signature object 174 may be a dynamic signature image (e.g., a dynamic image showing a handwritten "Joe"), and the dynamic signature image may be encoded into an image format string array (e.g., a Base64 image format string array) by the processor 162 of the second electronic device 160. The image format string array may consist of a plurality of string (e.g., a plurality of Base64 image format strings), and the plurality of image format strings may respectively represent a plurality of static images generated while the handwritten "Joe" was being signed. For example, the plurality of static images may include a first static image representing "J," a second static image representing "Jo," and a third static image representing "Joe" for recording the signature track of Joe's handwritten signature. In step 234, the second electronic device 160 may transmit, via the communication device 164, the image format string array representing the signature object 174 to the document server 120 through the communication channel S7. In step S236, the document server 120 receives the image format string array, converts the image format string array into a video format string array (e.g., Base64 video format string array), and transmits the video format string array to the notification server 130 through the communication channel S9. In step S238, the notification server 130 receives the video format string array and transmits the video format string array to the first electronic device 150 through the communication channel S10. In step S240, after the video format string array is received by the first electronic device 150, the processor 152 may decode the video format string array into a dynamic signature video (e.g., a video showing the handwritten "Joe") and present the dynamic signature video on the signature area 172 of the second page 170b displayed on the display 155 (as shown in FIG. 4C). For example, when the dynamic signature video is a video showing the handwritten "Joe" and presented on the signature area 172 of the second page 170b displayed on the display 155, the signature track of the handwritten "Joe" is dynamically played. In the embodiment of the present disclosure, the dynamic signature video is a dynamic signature video in MP4 format but is not limited thereto.

In other embodiments of the present disclosure, the signature object 174 may include a static signature image (e.g., a static image showing the handwritten "Joe") and a dynamic signature image (e.g., a dynamic image showing the handwritten "Joe"). The static signature image may be encoded into an image format string (e.g., a Base64 string) by the processor 162 of the second electronic device 160, and the dynamic signature image may be encoded into an image format string array (e.g., a Base64 image format string array) by the processor 162 of the second electronic device 160. In step 234, the second electronic device 160 may transmit, via the communication device 164, the image format string and the image format string array representing the signature object 174 to the document server 120 through the communication channel S7. In step S236, the document server 120 receives the image format string and the image format string array from the second electronic device 160 and converts the image format string array into a video format string array (e.g., Base64 video format string array). Then, the document server 120 may sequentially or simultaneously transmit the image format string and the video format string array to the notification server 130 through the communication channel S9. In step S238, the notification server 130 may receive the image format string and the video format string array sequentially or simultaneously and transmit the image format string and the video format string array sequentially or simultaneously to the first electronic device 150 through the communication channel S10. In step S240, after the image format string and the video format string array are sequentially or simultaneously received by the first electronic device 150, the processor 152 may decode the image format string back into the static signature image (e.g., the static image showing the handwritten "Joe") and decode the video format string array into a dynamic signature video (e.g., a video showing the handwritten "Joe"). Afterwards, the decoded static signature image and the dynamic signature video are sequentially presented on the signature area 172 of the second page 170b displayed on the display 155 (as shown in FIG. 4C). In an embodiment of the present disclosure, the processor 152 first presents the decoded static signature image on the signature area 172 of the second page 170b displayed on the display 155 (as shown in FIG. 4C), and then presents, according to a selection of a function button provided on the host APP 151 and corresponding to a function of displaying the dynamic signature video, the dynamic signature video on the signature area 172 of the second page 170b displayed on the display 155, thus replacing the decoded static signature image. In the embodiment of the present disclosure, the dynamic signature video is a dynamic signature video in MP4 format but is not limited thereto.

In summary, with the system and method provided by the present disclosure for displaying an online electronic document, a multiple participants can review and/or execute a signature on the online electronic document together. In addition, when a participant A performs an operation (such as turning a page or executing a signature) on an electronic document, all other participants B can simultaneously see the operation performed by the participant A on the electronic document from the electronic devices they use, thus improving the efficiency of multiple participants reviewing the same electronic document. In addition, in the system and method provided by the present disclosure for displaying an online electronic document, when no operation (such as turning a page or executing a signature) is performed on the electronic document, no image data related to the electronic document is transmitted between each device and each server. Therefore, compared with other technologies that use network streaming to review electronic documents, the system and the method provided by the present disclosure for displaying an online electronic document can effectively save the network bandwidth and effectively reduce the labor and time cost for reviewing the electronic documents.

Although the present disclosure has been disclosed by way of above embodiments, the embodiments are not intended to limit the present disclosure, and those skilled in the art will appreciate that changes and modifications may be made therein as long as those changes and modifications do not deviate from the spirit and the scope of the present disclosure. Therefore, the scope of the present disclosure should be construed according to the definitions in the appended claims.

What is claimed is:

1. A system for displaying an online electronic document, comprising:
   a remote conference server configured to establish a conference call connection between a first electronic device and a second electronic device;
   a document server; and
   a notification server, wherein:
      the document server is configured to provide an electronic document for the first electronic device and the second electronic device to download, and the electronic document comprises at least a first page and a second page, wherein the second page has a signature area;

after the electronic document is downloaded by the first electronic device and the second electronic device from the document server, respectively, the first page of the electronic document is synchronously displayed on a first display of the first electronic device and a second display of the second electronic device;

the first page displayed on the first display is switched to the second page through a first page turning operation to cause the first electronic device to generate a first page turning indication and transmit the first page turning indication to the document server;

the document server is configured to receive the first page turning indication from the first electronic device and transmit the first page turning indication to the notification server;

the notification server is configured to receive the first page turning indication from the document server and transmit the first page turning indication to the second electronic device;

after the first page turning indication is received by the second electronic device, the first page displayed on the second display is switched to the second page in response to the first page turning indication;

after the first page displayed on the second display is switched to the second page in response to the first page turning indication, the second page displayed on the second display is switched to the first page through a second page turning operation to cause the second electronic device to generate a second page turning indication and transmit the second page turning indication to the document server;

the document server is further configured to receive the second page turning indication from the second electronic device and transmit the second page turning indication to the notification server;

the notification server is further configured to receive the second page turning indication from the document server and transmit the second page turning indication to the first electronic device; and after the second page turning indication is received by the first electronic device, the second page displayed on the first display is switched to the first page in response to the second page turning indication.

2. The system of claim 1, wherein:

after the first page displayed on the second display is switched to the second page in response to the first page turning indication, the signature area is displayed on the second display for receiving a signature object, wherein the signature object is generated based on an input received by the second electronic device;

after the signature object is generated, the signature object is presented on the signature area displayed on the second display;

the document server is configured to receive the signature object from the second electronic device and transmit the signature object to the notification server;

after the notification server receives the signature object from the document server, the notification server transmits the signature object to the first electronic device; and after the signature object is received by the first electronic device, the signature object is presented on the signature area of the second page displayed on the first display, such that the signature object is synchronously presented on the signature area displayed on the first display and on the signature area displayed on the second display.

3. The system of claim 2, wherein:

the signature object is a static signature image, and the static signature image is encoded into an image format string by the second electronic device;

the signature object received and transmitted by the document server to the notification server is the image format string;

the signature object received and transmitted by the notification server to the first electronic device is the image format string; and after the image format string is received by the first electronic device, the image format string is decoded into the static signature image and presented on the signature area of the second page displayed on the first display.

4. The system of claim 2, wherein:

the signature object is a dynamic signature image, and the dynamic signature image is encoded into an image format string array by the second electronic device;

the signature object received by the document server from the second electronic device is the image format string array, the document server is further configured to convert the image format string array into a video format string array, and the signature object transmitted by the document server to the notification server is the video format string array;

the signature object received and transmitted by the notification server to the first electronic device is the video format string array; and after the video format string array is received by the first electronic device, the video format string array is decoded into a dynamic signature video and presented on the signature area of the second page displayed on the first display.

5. The system of claim 2, wherein:

the signature object includes a static signature image and a dynamic signature image, the static signature image is encoded into an image format string by the second electronic device, and the dynamic signature image is encoded into an image format string array by the second electronic device;

the signature object received by the document server from the second electronic device includes the image format string and the image format string array, the document server is further configured to convert the image format string array into a video format string array, and the signature object transmitted by the document server to the notification server includes the image format string and the video format string array;

the signature object received and transmitted by the notification server to the first electronic device includes the image format string and the video format string array;

after the image format string and the video format string array are received by the first electronic device, the image format string is decoded into the static signature image and the video format string array is decoded into a dynamic signature video; and the decoded static signature image and the dynamic signature video are sequentially presented on the signature area of the second page displayed on the first display.

6. A method for displaying an online electronic document, comprising:

establishing, by a remote conference server, a conference call connection between a first electronic device and a second electronic device;

providing, by a document server, an electronic document including at least a first page and a second page to be downloaded by the first electronic device and the second electronic device, wherein the second page has a signature area;

displaying the first page of the electronic document on a first display of the first electronic device and a second display of the second electronic device synchronously after the electronic document is downloaded by the first electronic device and the second electronic device from the document server, respectively;

switching the first page displayed on the first display to the second page through a first page turning operation to generate a first page turning indication;

receiving, by the document server, the first page turning indication and transmitting the first page turning indication to a notification server;

receiving, by the notification server, the first page turning indication from the document server and transmitting the first page turning indication to the second electronic device;

switching the first page displayed on the second display to the second page in response to the first page turning indication received from the notification server;

after the first page displayed on the second display is switched to the second page in response to the first page turning indication, switching the second page displayed on the second display to the first page through a second page turning operation to generate a second page turning indication;

receiving, by the document server, the second page turning indication and transmitting the second page turning indication to the notification server;

receiving, by the notification server, the second page turning indication from the document server and transmitting the second page turning indication to the first electronic device; and switching the second page displayed on the first display to the first page in response to the second page turning indication received from the notification server.

7. The method of claim 6, further comprising:

displaying the signature area of the second page on the second display after the first page displayed on the second display is switched to the second page;

receiving, by the second electronic device, an input to generate a signature object and presenting the signature object on the signature area displayed on the second display;

receiving, by the document server, the signature object from the second electronic device and transmitting the signature object to the notification server;

receiving, by the notification server, the signature object from the document server and transmitting the signature object to the first electronic device; and presenting the signature object on the signature area of the second page displayed on the first display after the signature object is received by the first electronic device.

8. The method of claim 7, wherein:

the signature object is a static signature image, and the static signature image is encoded into an image format string;

the signature object received and transmitted by the document server to the notification server is the image format string;

the signature object received and transmitted by the notification server to the first electronic device is the image format string; and presenting the signature object on the signature area of the second page displayed on the first display further comprises:

decoding the image format string into the static signature image and presenting the static signature image on the signature area of the second page displayed on the first display.

9. The method of claim 7, wherein:

the signature object is a dynamic signature image, and the dynamic signature image is encoded into an image format string array;

the signature object received by the document server from the second electronic device is the image format string array, the image format string array is converted by the document server into a video format string array, and the signature object transmitted by the document server to the notification server is the video format string array;

the signature object received and transmitted by the notification server to the first electronic device is the video format string array; and presenting the signature object on the signature area of the second page displayed on the first display further comprises:

decoding the video format string array into a dynamic signature video and presenting the dynamic signature video on the signature area of the second page displayed on the first display.

10. The method of claim 7, wherein:

the signature object includes a static signature image and a dynamic signature image, the static signature image is encoded into an image format string by the second electronic device, and the dynamic signature image is encoded into an image format string array by the second electronic device;

the signature object received by the document server from the second electronic device includes the image format string and the image format string array, the image format string array is converted into a video format string array by the document server, and the signature object transmitted by the document server to the notification server includes the image format string and the video format string array;

the signature object received and transmitted by the notification server to the first electronic device includes the image format string and the video format string array; and presenting the signature object on the signature area of the second page displayed on the first display further comprises:

decoding the image format string into the static signature image and decoding the video format string array into a dynamic signature video; and presenting the decoded static signature image and the dynamic signature video sequentially on the signature area of the second page displayed on the first display.

* * * * *